Figure 1:
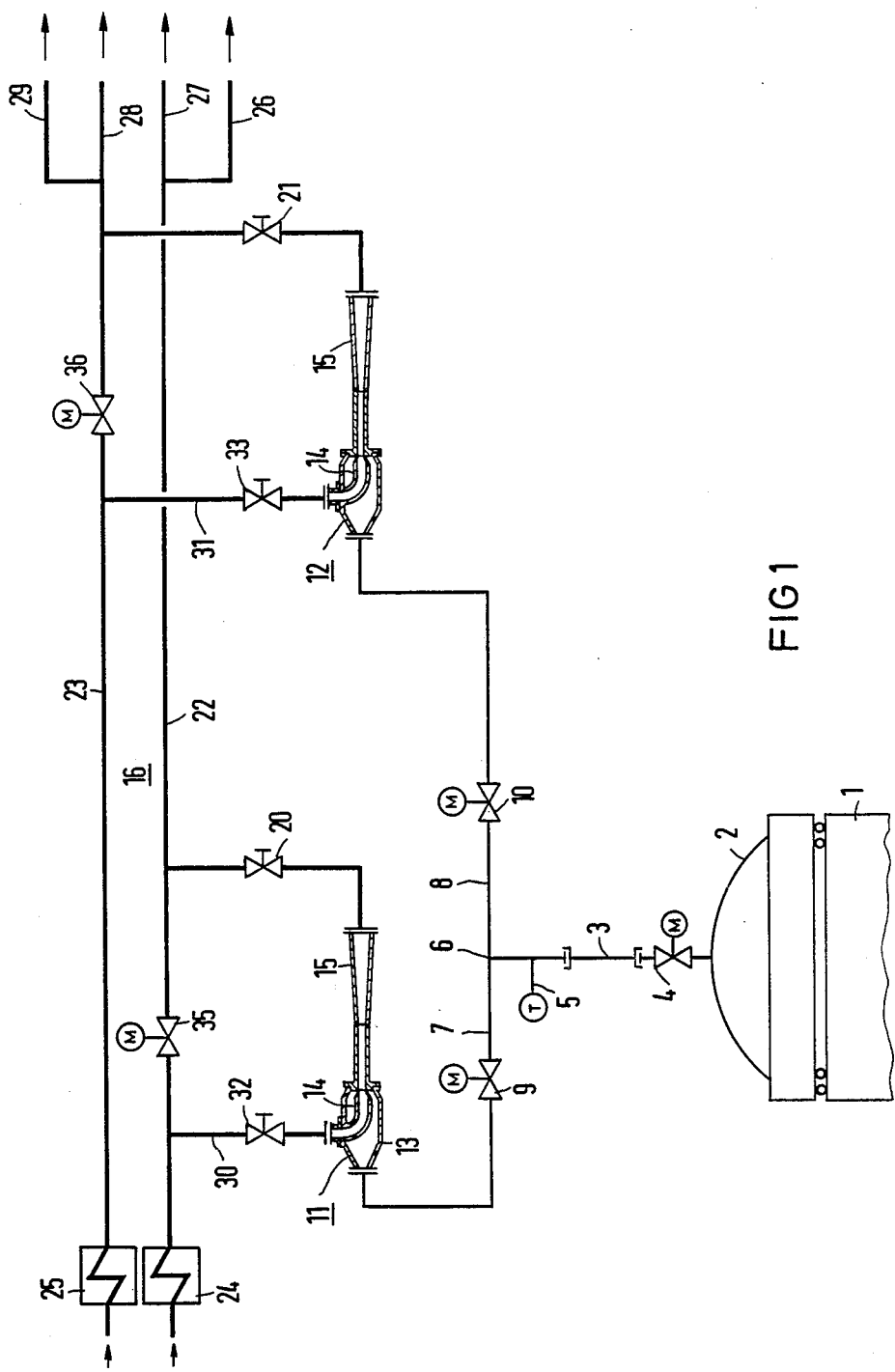

United States Patent [19]

Conrads

[11] Patent Number: 4,844,857
[45] Date of Patent: Jul. 4, 1989

[54] PRESSURIZED WATER REACTORS

[75] Inventor: Hermann-Josef Conrads, Herzogenaurach, Fed. Rep. of Germany

[73] Assignee: Kraftwerk Union Aktiengesellschaft, Mülheim, Fed. Rep. of Germany

[21] Appl. No.: 371,126

[22] Filed: Apr. 23, 1982

[30] Foreign Application Priority Data

Apr. 24, 1981 [DE] Fed. Rep. of Germany ....... 3116443

[51] Int. Cl.$^4$ .................. G21C 17/00; G21C 9/00; G21C 19/28
[52] U.S. Cl. .................. 376/247; 376/282; 376/298; 376/407
[58] Field of Search ............... 376/282, 299, 298, 407, 376/292, 372, 247, 219

[56] References Cited

U.S. PATENT DOCUMENTS

| | | | |
|---|---|---|---|
| 3,180,802 | 4/1965 | West et al. | 376/298 X |
| 3,369,971 | 2/1968 | Kägi | 376/247 X |
| 3,384,550 | 5/1968 | Hanzalek | 376/298 |
| 4,186,051 | 1/1980 | Buscher et al. | 376/282 X |
| 4,280,796 | 7/1981 | Reinsch | 376/282 X |

Primary Examiner—John S. Maples
Attorney, Agent, or Firm—Herbert L. Lerner; Laurence A. Greenberg

[57] ABSTRACT

Pressurized water reactor with a primary circuit including therein a reactor pressure vessel, a steam generator and a main coolant pump, and with an auxiliary system having high pressure pumps for feeding water into the primary circuit, including a line extending from an upper side of the pressure vessel and having at least one shut-off valve therein, the line connecting the reactor pressure vessel and a part of the auxiliary system wherein a lower pressure prevails than in the reactor pressure vessel.

5 Claims, 3 Drawing Sheets

PRESSURIZED WATER REACTORS

The invention relates to a pressurized water reactor and, more particularly, to a reactor with a primary circuit including therein a reactor pressure vessel, a steam generator and a main coolant pump, and with an auxiliary system having high-pressure pumps for feeding water into the primary circuit, the auxiliary system being connected with the reactor pressure vessel through a line extending from the upper side of the latter and having at least one shut-off or isolating valve therein.

In installations of the afore-described type, cold water was heretofore introduced into the reactor pressure vessel, to condense steam which may be present therein as a result of a leak. This requires pumps with a feed pressure higher than the steam pressure in the reactor pressure vessel. The cold water serving to effect the condensation can lead to thermal stresses, however, which are all the more undesirable whenever there is a failure.

It is accordingly an object of the invention to provide a pressurized water reactor which, in case of a power failure, when the main cooling pumps do not operate, and cooling of the reactor pressure vessel has broken down, removes hot cooling liquid in the upper part of the reactor pressure vessel without introducing cold water into the reactor pressure vessel by means of strong pumps.

With the foregoing and other objects in view, the invention which utilizes a technique exactly opposite that used in the heretofore known state of the art provides for a pressurized water reactor with a primary circuit including therein a reactor pressure vessel, a steam generator and a main coolant pump, and with an auxiliary system having high pressure pumps for feeding water into the primary circuit, comprising a line extending from an upper side of the pressure vessel and having at least one shut-off valve therein, the line connecting the reactor pressure vessel and a part of the auxiliary system wherein a lower pressure prevails than in the reactor pressure vessel.

With such construction, an outlet for the hot coolant is created, and the hot coolant is cooled outside of the reactor pressure vessel.

In accordance with another feature of the invention, the line is connected to the suction side of a water-jet pump, which is supplied and operated with the water of the auxiliary system as the working or driving fluid. The water-jet pump effects an intimate mixing with the colder water of the auxiliary system. Furthermore, a defined negative pressure can thereby be generated.

In accordance with a further feature of the invention, the auxiliary system used a volume control system of the pressurized water reactor, because the volume control system already had adequately dimensioned pumps for feeding water into the primary circuit. With these pumps, the coolant can be returned to the primary circuit, so that the liquid level therein is not reduced.

In accordance with an alternate feature of the invention, the auxiliary system is a boron-addition system of the pressurized water reactor, which is likewise provided with high pressure pumps. Furthermore, the auxiliary systems, regardless of the construction thereof, can be connected with the reactor pressure vessel by a motor-driven pump, for example, a centrifugal pump, in order to remove coolant by suction in a metered or dosed manner.

In accordance with an added feature of the invention, a temperature measuring station is provided in the line, so that the temperature of the discharging coolant can be used for controlling the quantitative discharge flow hereof, or the like.

In accordance with a concomitant feature of the invention, the pressure vessel has a conventional cover closing the top thereof, and the line extends from the cover of the pressure vessel.

Other features which are considered as characteristic for the invention are set forth in the appended claims.

Although the invention is illustrated and described herein as embodied in a pressurized water reactor, it is nevertheless not intended to be limited to the details shown, since various modifications and structural changes may be made therein without departing from the spirit or the invention and within the scope and range of equivalents of the claims.

Figure 2:
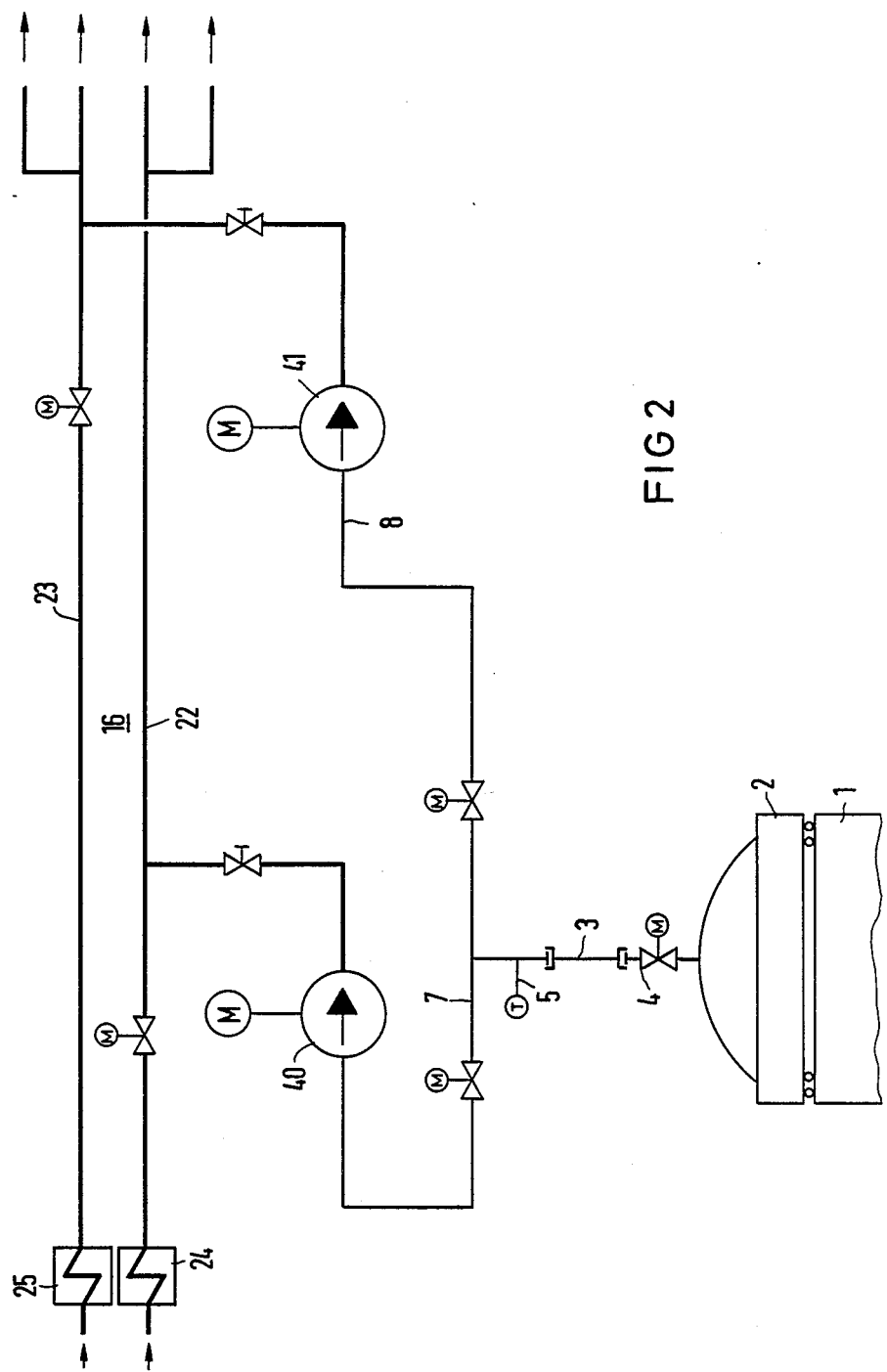
Figure 3:
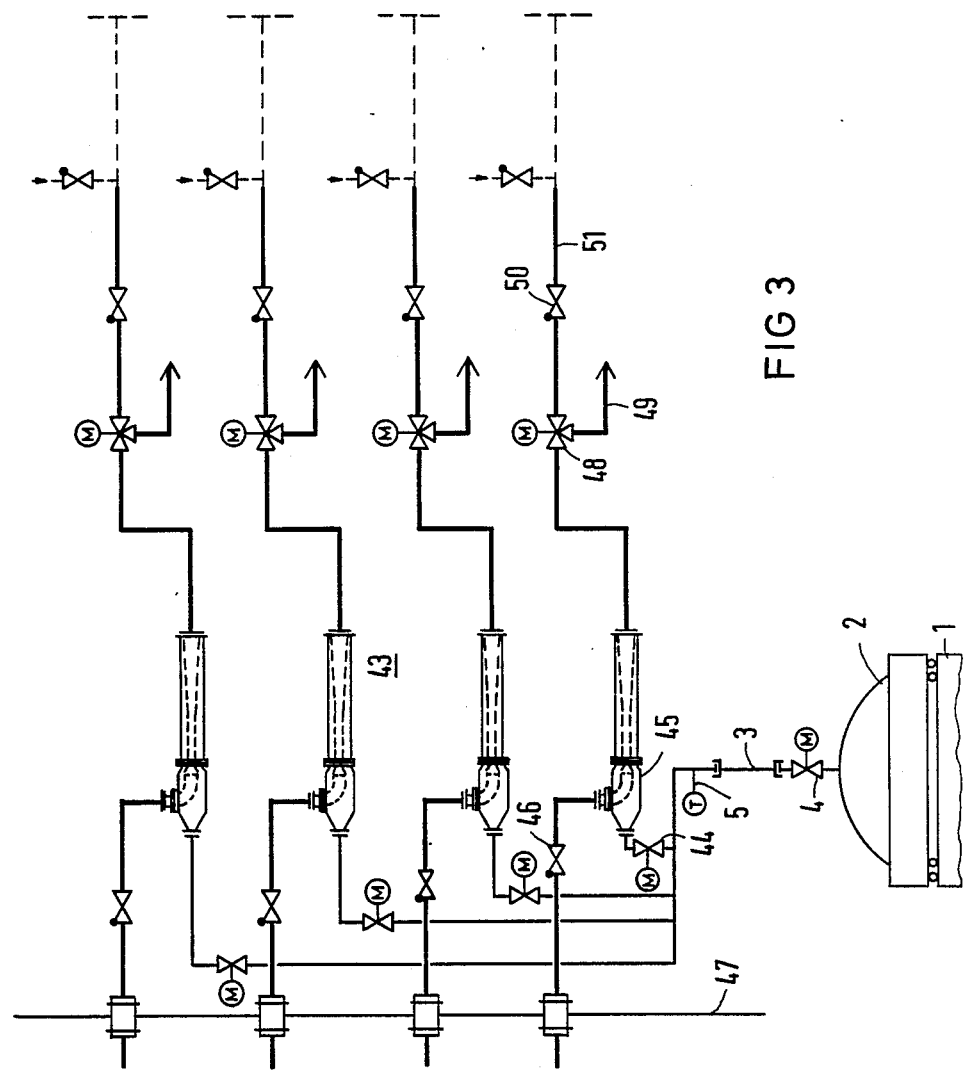

The construction and method of operation of the invention, however, together with additional objects and advantages thereof will be best understood from the following description of specific embodiments when read in connection with the accompanying drawings, in which:

FIGS. 1, 2 and 3 are fragmentary diagrammatic and schematic views of three different embodiments of a pressurized water reactor according to the invention.

Referring now to the drawing and first, particularly, to FIG. 1 thereof, there is shown a pressurized water reactor having, as the most important component of the primary circuit thereof, a reactor pressure vessel 1, which encloses the otherwise non-illustrated reactor core, the pressure vessel being closed by an arched or dome-shaped cover 2. A pipeline 3 extends from the highest point of this cover 2 through a valve 4 and a temperature measuring point or station 5 to a T-branch 6.

The line branches 7 and 8 extending from the T-fitting or joint 6 continue via shut-off of isolating valves 9 and 10 to two water-jet pumps 11 and 12 which are of identical construction, and, in fact, to the suction side 13 thereof, through which a nozzle 14 extends which is associated with a diffuser 15. Each diffuser 15 is connected via a respective valve 20, 21, to a respective pipeline 22, 23 of a volume control system 16, which extends, respectively, via recuperative heat exchangers 24 and 25 and branches 26, 27, 28 and 29 to four otherwise non-illustrated loops of the primary circuit of the pressurized water reactor.

Also connected to the pipeline 22 is a respective pressure line 30, 31 leading to the nozzle 14 and having a respective valve 32, 33, in an arrangement wherein the jet-pumps 11 and 12 are disposed parallel to respective reducing valves 35 and 36 in the line 22 or 23. The following mode of operation thereby results:

If, in a case wherein all the main coolant pumps of the pressurized water reactor fail, the water circulation in the reactor pressure vessel should be insufficient and, consequently, cooling thereby in insufficient, so that especially the hot water located below the cover 2 determines the pressure in the primary circuit and obstructs the feeding-in or emergency or auxiliary coolant, an outlet can be created by opening the valve 4 and the valve 9 or 10 which lead to the suction side of the respective water jet-pump 11 or 12. If the pumps 11 and 12 become operative by opening the valves 32 and 20, on the one hand, and valves 33, 21, on the other hand, while the valves 35 and 36, respectively, are at least partly or, preferably, completely closed, the hot coolant is sucked out of the reactor pressure vessel 1, and cooled by mixing with the water from the volume control system 16. The mixed liquid is then returned to the primary circuit, so that the water also reaches the reactor pressure vessel 1, and compensates there for the coolant loss caused by the removed coolant. This cooling of the coolant in the pressure-vessel cover 2 is effected without the use of additional high-pressure pumps and, primarily, without any danger that cold water is the reactor pressure vessel will cause thermal stresses.

In the embodiment according to FIG. 2, the water-jet pumps 11 and 12 of FIG. 1 are replaced by motor-driven cenrifugal pumps 40 and 41, to the suction side of which, respective lines 7 and 8 are connected. With these pumps 40 and 41, the negative pressure required for shunting the coolant is ensured, and the coolant is pumped to the respective pipelines 22 and 23 of the volume control system 16.

The embodiment according to FIG. 3 is provided with a fourfold branching of the outlet line 3. The individual brances are of identical construction. They include valves 44 and water-jet pumps 45, the pressure side of which is inserted via a valve 46 into a respective line of a boron-addition system 43, used as an auxiliary system. The outlet of the boron addition system 43, the lines of which extend through the wall 47 of the safety vessel, and are respectively connected via a three-way valve 48 to a line 49 which leads to a non-illustrated pressurizer of the primary circuit. Furthermore, the three-way valve 48, respectively, is connected via a valve 50 to a line 51 leading to a respective loop of the primary circuit of the reactor pressure vessel. Also in this case, the water-jet pumps 45 provide the required negative pressure in the reactor pressure vessel, and the desired discharge pressure, which assures the additional feeding of coolant into the primary circuit.

The foregoing is a description corresponding to German Application P No. 31 16 443.9, dated Apr. 24, 1981, International priority of which is being claimed for the instant application, and which is hereby made part of this application. Any discrepancies between the foregoing specification and the aforementioned corresponding German application are to be resolved in favor of the latter.

There are claimed:

1. Pressurized water reactor with a primary circuit including therein a reactor pressure vessel having a top cover, a steam generator and a main coolant pump, and with an auxiliary system having high pressure pumps for feeding water into the primary circuit, comprising a line extending from the top cover of the pressure vessel and having at least one shut-off valve therein, said line connecting the reactor pressure vessel to a part of the auxiliary system wherein a lower pressure prevails than in the reactor pressure vessel.

2. Pressurized water reactor according to claim 1, wherein said line is connected to the suction side of a water-jet pump which is supplied with the water of the auxiliary system as driving fluid.

3. Pressurized water reactor according to claim 1, wherein the auxiliary system is a volume control system of the pressurized water reactor.

4. Pressurized water reactor according to claim 1 wherein the auxiliary system is a boron-addition system of the pressurized water reactor.

5. Pressurized water reactor according to claim 1, wherein a temperature measuring station is located in said line.

* * * * *